INVENTOR
DONALD K. ALLISON
BY
ATTORNEY

Patented Aug. 13, 1946

2,405,553

UNITED STATES PATENT OFFICE 2,405,553

MEANS AND METHOD OF OZONIZING LIQUIDS

Donald K. Allison, Beverly Hills, Calif.

Application June 7, 1941, Serial No. 397,070

12 Claims. (Cl. 210—27)

My invention relates to apparatus and method of ozonizing liquids, and among the objects of my invention are:

First, to provide an apparatus and method of ozonizing liquids wherein air is first treated to establish a high ozone content and is then intimately mixed with the liquid to be treated;

Second, to provide an apparatus and method of ozonizing liquids wherein air is first compressed, dried and cooled, all at a substantial pressure, and then is substantially reduced in pressure for passage through an electrostatic field, the pressure being still further reduced while the air is being intimately mixed with the liquid to be treated;

Third, to provide an apparatus for ozonizing liquids which may be constructed compactly as a portable self-contained unit;

Fourth, to provide an apparatus and method for ozonizing liquids which is particularly adapted to treat water for drinking purposes;

Fifth, to provide an apparatus and method of ozonizing liquids which insures complete and uniform treatment of the water or other liquid;

Sixth, to provide an apparatus which incorporates a novelly arranged absorber for insuring complete and intimate mixture of ozonized air with the liquid undergoing treatment, and therefore complete oxidation of the impurities in the liquid; and Seventh, to provide an apparatus and method of treating liquids which incorporate a novel arrangement causing flow of air through the preliminary air-treating and ozonizing elements merely by the induction of the ozone-laden air into the liquid to be treated.

With the above and other objects in view, as may appear hereinafter, reference is directed to the accompanying drawings, in which.

Figure 1:
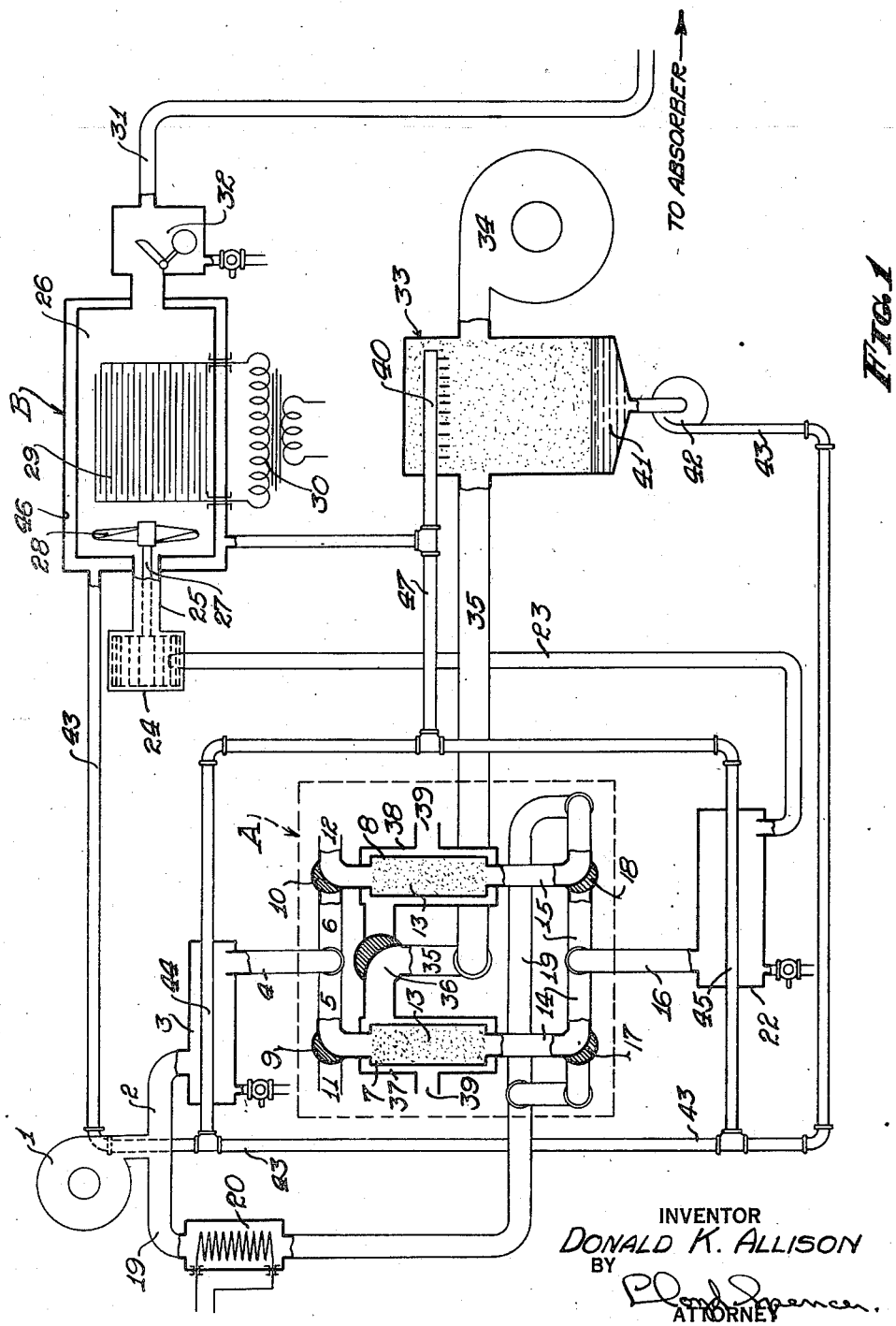
Figure 1 is a flow diagram of my apparatus, showing particularly the dryer and ozonizer.

My apparatus consists principally of a dryer A, an ozonizer B and an absorber C. With reference first to Figure 1, an air compressor 1 is connected by a pipe line 2 to a precooler or heat exchanger 3 which in turn is connected by a pipe line 4 having branches 5 and 6 to dryer units 7 and 8, valves 9 and 10 being interposed in the branch lines 5 and 6. The valves are arranged so that air may be directed from the precooler into either one of the dryer units. Each valve connects its dryer with the precooler or vents its dryer unit to atmosphere through a discharge line 11 or 12.

Each dryer unit consists of a chamber filled with a suitable dehydrating agent such as activated aluminum oxide 13. Other suitable desiccants are silica gel and calcium chloride. The dryer units are provided with discharge pipes 14 and 15 which connect to a common pipe 16. Valves 17 and 18 are interposed in the discharge pipes 14 and 15.

A heater line 19 is connected with the compressor and has interposed therein a heater 20. The heater line communicates with the valves 17 and 18, and the valves are so arranged that they connect the discharge ends of the dryer units either with the pipe 16 or with the heater line.

Air from the compressor and precooler is passed through one of the dryer units while heated air is back-passed through the other dryer. The valves 9, 10, 17 and 18 are preferably three-way valves so that either dryer may be closed from both the heater line and the precooler line for the reason that the reactivating period required for each dryer is of less duration than the operating period and it is unnecessary to circulate heated air through the inactive dryer for the full operating period of the active dryer.

The pipe line 16 is connected to an after-cooler or heat exchanger 22 similar to the precooler 3. The after-cooler in turn is connected to a pipe line 23 leading to an expansion engine 24. The discharge side of the expansion engine communicates through a tube 25 with an ozonizer chamber 26. The expansion engine drives a shaft 27, on the end of which within the ozonizer chamber is a fan 28. The ozonizer chamber 26 contains ozone-generating elements 29 which may be in the form of metal plates separated by glass spacers and arranged so that air may pass in and around the plates. The ozone-generating elements 29 are connected to the secondary of a transformer 30, the potential of which is sufficient to cause a static discharge between the ozone-generating elements at the pressure maintained in the ozone chamber. However, the voltage is preferably maintained below that which would cause actual arcing between the plates.

The ozonized air from the ozonizer chamber 26 is delivered to a pipe line 31 in which is provided a suitable back-flow valve 32 to prevent back-flow of liquid from the line 31 into the ozonizer chamber.

The ozonizer chamber, precooler and after-cooler are connected with a cooling system which includes an evaporative cooler housing 33 into which air is delivered from a blower 34. The air passes through the housing 33 and into a blower line 35 which is connected through a valve 36 to suitable jackets 37 and 38 provided around the dryer units 7 and 8. The valve 36 is so arranged that cooling air from the blower passes around the dryer in operation, but is isolated from the dryer which is idle and undergoing reconditioning. The jackets 37 and 38 are provided with suitable discharge ports 39.

A spray tube 40 discharges liquid into the evaporative cooler housing and the liquid is collected in a sump 41 which is connected to a pump 42, which delivers the cooling liquid to a distributor line 43 connected with a precooler tube 44 and after-cooler tube 45, as well as a jacket 46 surrounding the ozonizer chamber 26. The tubes 44, 45 and jacket 46 are connected to a return line 47 which in turn is connected to the spray tube 40. The cooling liquid, of course, does not come in contact with the air being treated.

Figure 2:
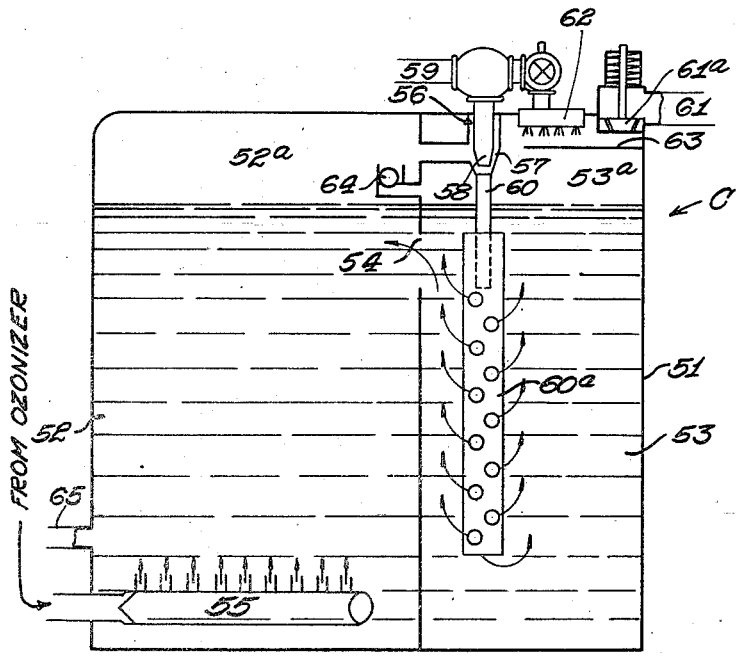
Figure 2 is a similar diagram showing the absorber.

With reference now to Figure 2, which illustrates the absorber: The absorber comprises a housing 51 which is divided into a final treating compartment 52 and an initial treating compartment 53 adapted to be partially filled with liquid to be treated, having head chambers 52a and 53a above the liquid. The ozone pipe 31 enters the final treating compartment 52 near the bottom thereof and is connected to a perforated distributor pipe 55. The ozone bubbles upwardly through water, or other liquid to be treated, in the final treating compartment and collects in the head chamber 52a thereof. In the head chamber 53a of the initial treating compartment there is positioned an injector 56 which comprises an injector jacket 57 connected with the head chamber 52a of the final treating compartment 52. An injector nozzle 58 extends into the jacket 57. The injector nozzle 58 is connected with a source of raw water 59 or other liquid to be treated. The raw liquid and ozone are drawn downwardly through the injector jacket 57 into an injector discharge tube 60 which extends into the liquid contained in the initial treating compartment 53. A perforated baffle 60a may surround the extremity of the discharge tube 60. The ozone in compartment 53 bubbles upwardly into the head chamber 53a thereof and out of the absorber through vent 61, which may have a check valve 61a to prevent back-flow. A spray unit 62 and baffle plates 63 are so arranged in relation to the air vent that the ozone and air must pass through the spray before discharging from the air vent. The spray is supplied with raw liquid from the raw liquid source 59.

The two compartments 52 and 53 are connected below their liquid levels by an equalizer port or opening 54. Above the liquid levels the head chambers 52a and 53a are connected through an opening controlled by a check valve 64 which opens from the chamber 53a into the chamber 52a whenever the pressure differential exceeds a predetermined amount, thus preventing the liquid level from rising in the compartment 52 to the point where it would interfere with operation of the injector. The ozonized water is removed from compartment 52 through pipe 65 located at any suitable point, preferably near the lower side of the compartment.

My method of ozonizing liquids is as follows: Air is drawn into the compressor 1, compressed and initially cooled by the precooler 3. It is then passed through either one or the other of the dryer units to remove the moisture. The air is again cooled by the after-cooler 22 and delivered to the expansion engine. The air in expanding and performing work in the expansion engine is still further cooled; consequently, the air entering the ozonizer is both dry and cold, and therefore in the best condition possible for conversion to ozone.

Action of the electrical discharge from the ozone-generating elements 29 produces considerable quantities of heat in the air being ozonized and in the elements themselves. The increase in temperature produced thereby is very detrimental to efficient production of ozone. Therefore, the annular cooling jacket 46 is provided to circulate cold water around the ozonizer chamber 26, and the heat is thereby transferred from the ozonized air which is recirculated by fan 28. This cooled air also cools the generating elements and the efficiency of the generating system is thereby improved.

After the air has circulated in the ozone chamber by action of the fan 28 the ozonized air passes through the pipe 31 into the absorber. Here the air richest in ozone flows initially through that part of the liquid undergoing treatment which has already received an initial oxidation by the ozone. After collecting at the top of the liquid in chamber 52a the partially depleted ozone-laden air is turbulently mixed with the raw liquid by reason of the injector 56 and caused to bubble upwardly through the liquid in the initial treating compartment. Then in order to insure complete utilization of the ozone, the air, now almost free of ozone, is discharged through a spray of raw liquid. The air is passed as rapidly as possible from the compressor through its cooling and drying stages, and through the ozonizer to the water, and is violently agitated with the water so that maximum efficiency is obtained from the system. By circulating the air at a substantial pressure, the size of the parts may be relatively small compared with the capacity of the apparatus. Air is preferably circulated from the compressor under 2 or 3 atmospheres pressure to the expansion engine where its pressure is reduced to slightly above atmospheric, at which pressure very efficient operation of the ozonizer may be obtained. As will be apparent, the pressure will be still further reduced in the absorber.

The entire apparatus readily lends itself to assembly as a unitary structure; that is, a self-contained unit which may be readily transported. An actual apparatus occupying only 3 x 5 x 6 feet has been constructed and is capable of treating 200,000 gallons of water per 24-hour day.

Figure 3:
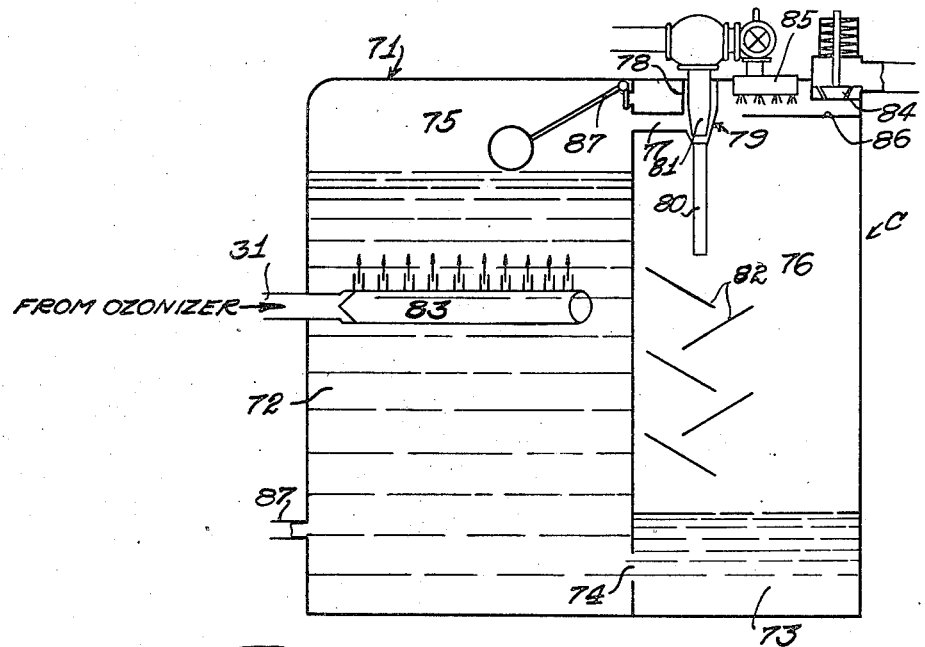
Figure 3 is a diagrammatical view similar to Figure 2, showing a modified form of absorber.

Reference is now directed to Figure 3: The structure here shown is in most respects similar to the apparatus shown in Figure 2. The essential difference is that in Figure 3 the apparatus is designed to maintain a subatmospheric pressure in the ozone line 31 and ozonizer chamber 26; in fact, the subatmospheric pressure may be maintained at such a point that the compressor 1 may be dispensed with, in which case the air circulates through the dryer and associated parts to the expansion engine at substantially atmospheric pressure, so that the expansion engine 24 is operated by the pressure differential determined by the subatmospheric pressure in the ozonizer chamber.

The apparatus shown in Figure 3 comprises a housing 71 divided into a final treating compartment 72 and an initial treating compartment 73. The two compartments are connected below their liquid levels by a port 74 which permits flow of liquid from the initial treating compartment 73 to the final treating compartment 72. Head chambers 75 and 76 are formed above the liquid levels of the compartments 72 and 73, respectively. The head chamber 75 is connected by a tube 77 to a jacket 78 of an injector 79, which has a downwardly directed outlet 80. The injector 79 is mounted in the compartment 73 and is provided with a nozzle 81 connected with the source of liquid to be treated. The liquid or water and the ozone-laden air from the head chamber 75 are delivered through the discharge tube 80 downwardly into the compartment 73, the mixture striking baffle plates 82. By reason of the operation of the injector and the fact that the two compartments 72 and 73 are connected below their liquid levels by the port 74 a pressure differential is established between the head chambers 75 and 76. The ozone pipe 31 is connected to a distributor tube 83 positioned in the compartment 72 at a point above the liquid level in the compartment 73. Consequently, the pressure at the openings of the distributor tube is below atmospheric pressure, but is, of course, slightly higher than the pressure existing above the liquid level in compartment 72, depending upon the depth of immersion of the distributor pipe. The negative or subatmospheric pressure in the ozone pipe 31 maintains a flow of the air from the dryer into the expansion engine and ozonizer chamber.

The air and spent ozone from the head chamber 76 of compartment 73 discharge through a check valve 84, preferably first passing underneath a spray 85 connected with the source of raw liquid and is guided there by a baffle 86.

The actual manner in which the ozonized air mixes with the liquid is the same in regard to Figure 3 as in the case of Figure 2, with the exception that the pressures involved are lower. More specifically, the incoming ozone-laden air is delivered to the final treating compartment where it is first mixed with water which has been previously partially treated and the ozone and air collected in the chamber 75 is mixed by the injector 79 and delivered to the initial treating compartment 73, and finally the remaining air and ozone is discharged through the vent 84. The treated liquid may be drawn off by pipe 87 located at any suitable point from the final treating compartment 72.

A float valve 187 may be provided between the head chambers 75 and 76 to permit back-flow of air from the head chamber 76 should the liquid level in compartment 72 rise above a predetermined level.

When the arrangement shown in Figure 3 is employed it is, of course, obvious that the size of the pipes employed in the dryer and ozonizer must be increased for the same quantity of ozonized air and, therefore, for a given volumetric output of treated water the size of the apparatus associated with Figure 3 is larger than that required in connection with Figure 2.

With reference to the ozonizer, and particularly the expansion engine and fan, these two devices actually constitute a self-regulating pressure-reducing valve without the use of constricted openings. The expansion engine 24 is preferably a positive displacement type as, for example, a sliding vane pump or "Roots" impeller pump, wherein a definite volume of gas is passed through the pump or engine for each rotation thereof. The power required to drive the fan increases as the pressure in the ozonizer chamber increases, with the result that increased pressure in the ozonizer chamber increases the power requirements, which decreases the speed of the expansion engine and therefore decreases the quantity of air that is admitted. This function obtains whether the first described method is used, namely, the one in which a compressor is used to maintain a relatively high pressure head of the expansion engine, or whether the second system is used, in which a vacuum is maintained in the ozonizer to draw the air therein.

Various changes and alternate arrangements may be made within the scope of the appended claims, in which it is my intention to claim all novelty inherent in the invention as broadly as the prior art permits.

I claim:

1. A method of ozonizing liquids, characterized by: driving with compressed air an expansion engine, thereby expanding and reducing the pressure and temperature of the air; delivering the expanded air to an ozonizer chamber having a moving element therein to recirculate the air in said chamber; driving by the expansion engine said moving element, subjecting the air in the chamber to electrical discharge to ozonize the same, and then intimately mixing the ozonized air with the liquid to be treated.

2. A method of ozonizing a liquid comprising, compressing and cooling air, then conducting the compressed and cooled air through an expansion engine to drive the same, the air being expanded and further cooled in passing through said engine, then delivering the air to an ozonizing chamber, subjecting the air within the chamber to electrical discharge to ozonize the same, operating an air circulating device within the chamber by the expansion engine to circulate the air while it is subjected to the electrical discharge, thereafter intimately mixing the ozonized air from the chamber with the liquid to be treated, and varying the back pressure in the ozonizer chamber in accordance with variation in the rate of flow of liquid being treated during the mixing operation.

3. A method of ozonizing liquids, characterized by: drying, cooling and ozonizing air; passing fresh ozonized air upwardly through a column of downwardly flowing partially ozonized liquid; thereafter injector-mixing the resulting partially deozonized air with raw liquid; thereafter spray-mixing the resulting further deozonized air with raw liquid; delivering the partially ozonized spray-mixed injector-mixed liquid into contact with said fresh ozonized air; then removing the ozonized liquid.

4. The method of ozonizing a liquid comprising compressing air to the order of two to three atmospheres, cooling and drying the compressed air, thereafter further cooling the compressed air, then conducting the air through an expansion engine to perform mechanical work and to reduce the pressure of the air to a value slightly in excess of atmospheric pressure and to reduce the temperature of the air, conducting the expanded air to an ozonizer chamber, subjecting the air in the chamber to electrical discharge to ozonize the air, and utilizing the mechanical work performed by the engine to continuously circulate and recirculate the air in the chamber, and intimately mixing the ozonized air with the liquid to be treated.

5. Apparatus for ozonizing a liquid comprising a compressor for compressing air, means for cooling the compressed air, means for drying the cooled air, an air expansion engine, means for conducting the compressed cooled and dried air through said engine to drive the same thereby reducing the pressure and temperature of the air, an ozonizing chamber, means to conduct the air from said engine to said chamber, an impeller in said chamber for circulating and recirculating the air therein, means connecting the impeller and engine, electrical discharge means in said chamber for ozonizing the air, and means to intimately mix the ozonized air with the liquid to be treated.

6. An apparatus for producing ozone and for ozonizing liquids, comprising an ozone generator for treating and ozonizing an oxygen-containing gas, conduit means for conducting the gas to said generator, an absorber, an injector for introducing raw liquid into said absorber, means for conducting ozonized gas from said generator to said injector, and a member associated with said injector and extending downwardly into said absorber for conducting injector-mixed liquid and ozonized gas into the liquid in the absorber, said member being provided with openings spaced along the length thereof.

7. Apparatus for ozonizing liquids comprising means for ozonizing air, an absorber for mixing the ozonized air with a liquid comprising a final treating compartment and an initial treating compartment, said compartments being adapted to be substantially filled with the liquid, means to establish communication between said compartments adjacent the upper portions thereof to enable the flow of liquid from the initial treating compartment to the final treating compartment, a conduit for conducting the ozonized air directly from the ozonizing means to the final treating compartment and for discharging the air beneath the surface of the liquid therein, means communicating with the final treating compartment above the surface of the liquid therein for injector-mixing partially deozonized air resulting from passage of said ozonized air through the liquid in the final treating compartment with raw liquid and discharging the mixture into said initial treating compartment, and means for withdrawing ozonized liquid from the final treating compartment.

8. Apparatus for ozonizing liquids comprising means for ozonizing air, an absorber for mixing the ozonized air with a liquid comprising a final treating compartment and an initial treating compartment, said compartments being adapted to be substantially filled with the liquid, means to establish communication between said compartments adjacent the upper portions thereof to enable the flow of liquid from the initial treating compartment to the final treating compartment, a conduit for conducting the ozonized air directly from the ozonizing means to the final treating compartment and for discharging the air beneath the surface of the liquid therein, means for mixing partially deozonized air from the final treating compartment with raw liquid comprising an ejector nozzle communicating with a source of raw liquid, a casing surrounding said nozzle and communicating with the final treating compartment adjacent the top portion thereof, a conduit for conducting the mixture of raw liquid and partially deozonized air beneath the surface of the liquid in the initial treating compartment, and a liquid discharge conduit communicating with the final treating compartment.

9. Apparatus for ozonizing liquids comprising means for ozonizing air, an absorber for mixing the ozonized air with a liquid comprising a final treating compartment and an initial treating compartment, said compartments being adapted to be substantially filled with the liquid, means to establish communication between said compartments adjacent the upper portions thereof to enable the flow of liquid from the initial treating compartment to the final treating compartment, a conduit for conducting the ozonized air directly from the ozonizing means to the final treating compartment and for discharging the air beneath the surface of the liquid therein, and means for reducing the pressure at the discharge outlet of the conduit and for mixing partially deozonized air from the final treating compartment with raw liquid comprising an injector device, means associated with said device for conveying the air and liquid mixture beneath the surface of the liquid in the initial treating compartment, and means to withdraw ozonized liquid from the final treating compartment.

10. Apparatus for ozonizing a liquid comprising means for compressing and cooling air, an air expansion engine, means for conducting the compressed and cooled air through said engine to drive the same, the air being reduced in pressure and further cooled in passing through and driving said engine, an ozonizing chamber having electrical discharge means therein, means to conduct the air from the air engine to said chamber where it is subjected to the action of said electrical discharge means to ozonize the air, an impeller drivably connected with the air engine and positioned within the chamber to circulate the air over the discharge means, an absorber for the liquid to be treated, means for conducting the ozonized air from the chamber to the absorber, and means for intimately mixing the ozonized air with the liquid and for varying the back pressure in the ozonizer chamber in accordance with variation in the rate of flow of liquid being treated, whereby the back pressure will be reduced as the rate of flow of liquid is increased and increased as the rate of flow of liquid is reduced.

11. Apparatus as defined in claim 5 wherein the means to subject the liquid to be treated to the action of the ozonized air includes an injector device for varying the back pressure in the chamber in accordance with variation in the quantity of liquid to be treated.

12. Apparatus for ozonizing a liquid comprising means for compressing and cooling air, an air expansion engine, means for conducting the compressed and cooled air through said engine to drive the same, the air being reduced in pressure and further cooled in passing through and driving said engine, an ozonizing chamber having electrical discharge means therein, means to conduct the air from the air engine to said chamber where it is subjected to the action of said electrical discharge means to ozonize the air, an impeller drivably connected with the air engine and positioned within the chamber to circulate the air over the discharge means, an absorber for the liquid to be treated, means including an injector device for conveying raw liquid to the absorber, and means for conducting air from the chamber to the absorber and injector device, the latter functioning to intimately mix the ozonized air with the raw liquid and to vary the back pressure in the ozonizing chamber in accordance with variation in the quantity of raw liquid to be treated.

DONALD K. ALLISON.